United States Patent [19]
Mikoshiba et al.

[11] Patent Number: 5,099,495
[45] Date of Patent: Mar. 24, 1992

[54] SPREAD SPECTRUM COMMUNICATION DEVICE

[76] Inventors: Nobuo Mikoshiba, 30-18, Yagiyama-Honcho 2-chome; Kazuo Tsubouchi, 30-38, Hitokita 2-chome, both of Sendai-shi, Miyagi-ken, Japan

[21] Appl. No.: 493,912

[22] Filed: Mar. 14, 1990

[30] Foreign Application Priority Data

Mar. 24, 1989 [JP] Japan ................................. 1-73477

[51] Int. Cl.⁵ ............................................... H04L 27/30
[52] U.S. Cl. .......................................... 375/1; 380/34; 375/100
[58] Field of Search ................ 375/1, 100; 380/31-34, 380/38, 46

[56] References Cited

U.S. PATENT DOCUMENTS

| | | | |
|---|---|---|---|
| 4,688,251 | 8/1987 | Citron et al. | 380/34 |
| 4,884,284 | 11/1989 | Nakayama | 375/1 |

FOREIGN PATENT DOCUMENTS 0086638  3/1989  Japan ..................................... 375/1

OTHER PUBLICATIONS

R. C. Dixon, *Spread Spectrum Systems;* (John Wiley & Sons, 1984; pp. 48-52).

Primary Examiner—Bernarr E. Gregory
Attorney, Agent, or Firm—Flynn, Thiel, Boutell & Tanis

[57] ABSTRACT

In a spread spectrum communication device using a convolver as a correlator, the modulation-demodulation system is so constructed that characteristics peculiar to the convolver are utilized for the frequency hopping of the base band primary modulated information and the spectrum spreading process using a pseudo noise code.

11 Claims, 5 Drawing Sheets

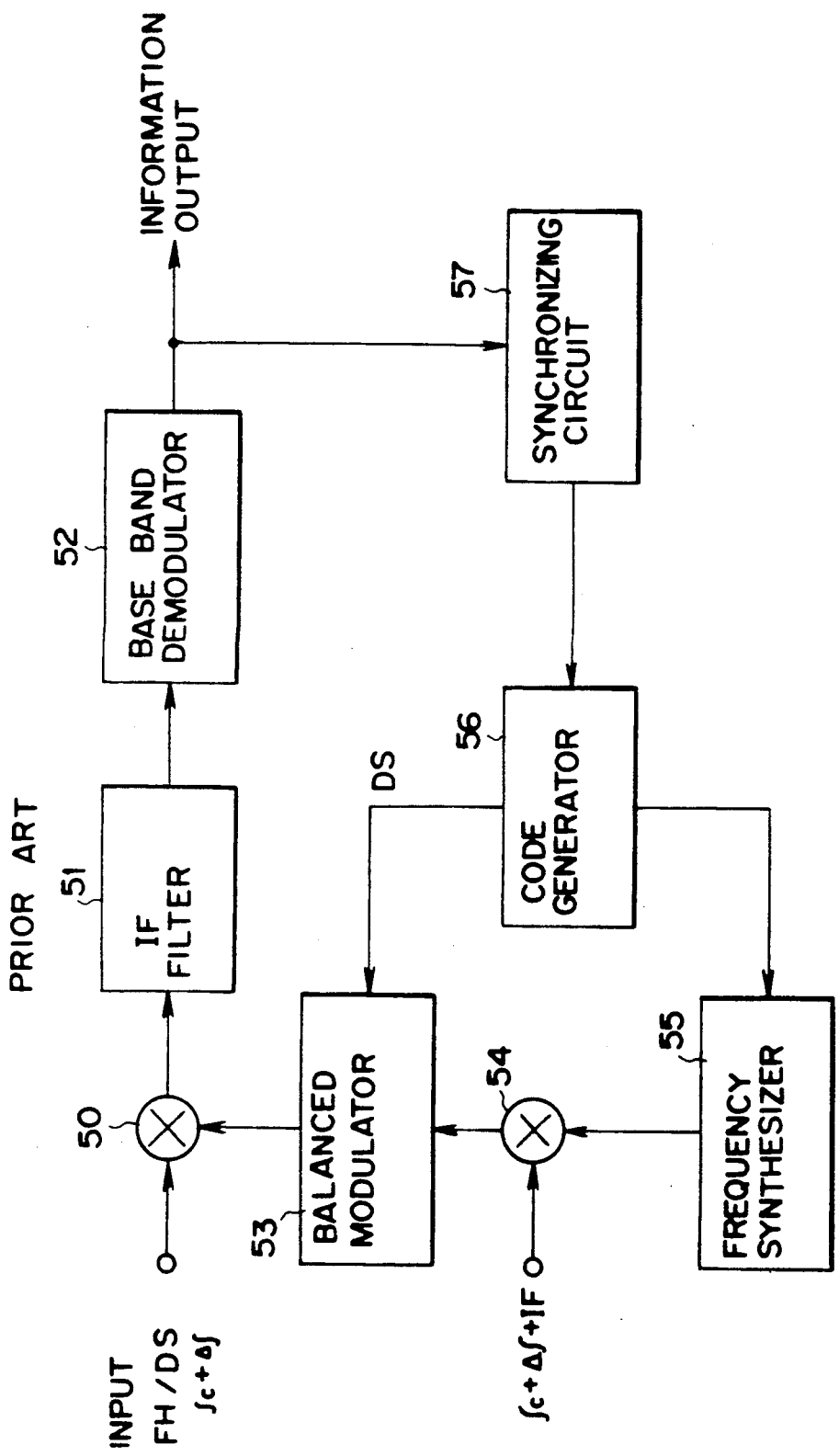

SPREAD SPECTRUM COMMUNICATION DEVICE

FIELD OF THE INVENTION

The present invention relates to an improvement of a spread spectrum communication device, which transmits and receives various sorts of information by using spread spectrum.

BACKGROUND OF THE INVENTION

Heretofore various sorts of systems have been researched and developed as communication systems. Among them the spread spectrum communication system is known as a system having a high reliability.

By this spread spectrum communication system, on the transmitter side, a primary modulated signal of data in a narrow frequency band of base band information, sound, etc. is transmitted with spread spectrum obtained by hopping to a plurality of frequence in a wide frequency band with a high speed (FH method, frequency hopping), by spreading spectrum in a wide frequency band by using a high spread pseudo noise code (PN code) (DS method, Direct Sequence), or by combining them (FH/DS method), and on the receiver side, an information signal is reproduced by inversely spreading the wide band signal to the original narrow band primary modulated signal by means of a correlator. Recently attention is paid to this spread spectrum communication system as a communication system having a very high reliability from several points of view that it is resistant to external interference and noise, that it has a high secrecy, etc.

Now the greatest point in this spread spectrum communication system is the construction of the correlator on the receiver side. At present, in the wireless spread spectrum communication system, the correlator, which is thought to be the simplest and to have a high reliability, is a device using surface acoustic wave (SAW).

In SAW convolvers there are, in general, those of correlator type (tapped delay line type) and those of convolver type. Here, although those of correlator type have a simple construction and generally a high efficiency, they are influenced seriously by the temperature coefficient of the substrate. On the contrary, those of convolver type are hardly influenced by temperature variations, but in general they have a low efficiency. However, the PN code described above of those of correlator type is fixed and they cannot deal with variations therein, while the kind of the PN code can be freely varied for those of convolver type. Consequently, if the efficiency is at a level usable in practice, the convolver type correlator can be much easily used.

Further, in the spread spectrum communication system, although the DS method can be realized in a very simple manner, because the frequency band of a high speed PN code is widened by mixing it with the base band information by means of one mixer, it has a weak point in the separation from other channels or in the remotelocal problem.

Therefore it is said that the FH/DS method is advantageous, by which the DS method is combined with the FH method, in order to overcome the weak point in the separation or the remote-local problem.

This method is a direct spreading modulation method, by which the central frequency hops periodically. FIG. 6 shows a spectrum of this modulation system. The spread spectrum signal indicated in the figure is composed of a number of spread signals. A direct spread signal covering a part of the whole band appears at each instance and on the other hand the signal as a whole has a frequency hopping pattern. The frequency hopping/direct spreading signal is used for the reasons enumerated as follows. That is, it is used for increasing the capacity of spreading the spectrum, for multiple connection and discrete address, and for multiplexing signals.

The output of the FH/DS modulator is nothing but that obtained by superposing a direct spreading modulation on a carrier hopping in frequency, as indicated in FIG. 7. In FIG. 7, reference numeral 40 is a frequency synthesizer; 41 is a code generator; 42 is a multiplier; 43 is a balanced modulator; and 44 is a transmitting antenna. The difference between this FH/DS modulation and the simple direct spreading modulation consists in that the carrier frequency is constant in the latter, while it varies in the former. Further, it is known that it is possible to construct a system, where code data coming from one code sequence generator 41 are supplied not only for determining the hopping pattern by means of the frequency synthesizer 40 but also for the balanced modulation for the direct spreading.

In the receiver, by this FH/DS method, it is a direct spreading correlator and a frequency hopping correlator superposed on each other that are used at demodulating the spread spectrum modulation before the demodulation of the base band. That is, a local reference wave is the frequency hopping/direct spread signal, which is multiplied by the input signal. FIG. 8 shows the construction of a typical FH/DS type receiver, in which reference numerals 50 and 54 are mixers; 51 is an IF filter; 52 is a base band demodulator 53 is a balanced modulator; 55 is a frequency synthesizer; 56 is a code generator; and 57 is a synchronizing circuit. The local reference oscillator is substantially the same as the modulator on the transmitter side except for the following two points, i.e. (a) that the central frequency is off-set by an amount corresponding IF and (b) that the direct spread code is not modulated by the base band input.

Although a combination of the frequency mixer 50 and the IF filter 51 is used as the correlator indicated in FIG. 8 stated above, it has a drawback that the synchronizing circuit 57 is complicated and the synchronization catch time is long.

As an FH/DS type correlator an SAW convolver has a number of practical advantages that the manner of the frequency hopping and the sort of the PN code can be freely changed. However, when the hopping frequency is selected simply arbitrarily, complexicity is produced in the timing synchronization of the hopping and improvement in the channel separation or local-distant problem cannot be obtained satisfactorily. Further, in the case where the frequency band width, which can be used, is restricted by a legal restriction, etc. the hopping method using a frequency interval of about 1/2 of the spread band width by the DS method, which has been studied heretofore, can take a small number of frequence and thus the effect of improving characteristics owing to the adoption of the FH/DS method is small.

OBJECT OF THE INVENTION

The object of the present invention is to realize the simplification of the modulation-demodulation method by utilizing characteristics peculiar to the convolver in the spectrum spreading process using the frequency hopping and the PN code, in the case where a convolver is used as a correlator.

SUMMARY OF THE INVENTION

In order to achieve the above object, an SSC device according to the present invention is characterized in that it comprises a transmitter including primary modulating means for obtaining base band primary modulated information from data to be transmitted, secondary modulating means for spreading the spectrum by hopping the frequency of the base band primary modulated information described above and tertiary modulating means for spreading the spectrum of the output of the secondary modulating means by using a PN code; and a receiver including demodulating means consisting of a convolver for correlating a mixture of a reference signal PN code, which is inverted in time with respect to the PN code in the transmitter described above and a frequency hopping signal, which is in synchronism with the timing of the frequency hopping on the transmitter side, with the received spread spectrum signal.

In the spread spectrum communication device according to the present invention, since the FH/DS method is adopted, the frequency may be hopped asynchronously with the base band information on the transmitter side and in addition the PN code can be generated asynchronously therewith. Therefore no complicated synchronization is necessary. In particular, when an SAW convolver is used as the convolver, since the output disappears, if the frequency on the reception side differs from that on the reference side by a value greater than the inverse ($f_g$) of a period of time necessary for the SAW to propagate under the output gate electrode, only the timing of the FH may be synchronized between the transmitter and the receiver and therefore it is possible to construct them in a very simple manner by increasing satisfactorily the speed of hopping the frequency of the FH and the speed of the PN code of the DS with respect to the base band information by setting the points, where the FH modulation described above hops, approximately with an interval of this $f_g$.

Consequently it is possible to use a number of hopping frequence in the restricted frequency band and also to intend considerable improvement in the channel separation, the distant-local problem, etc.

BRIEF DESCRIPTION OF THE DRAWINGS

FIG. 8 is a block diagram indicating a prior art FH/DS receiver.

DETAILED DESCRIPTION

Figure 1:
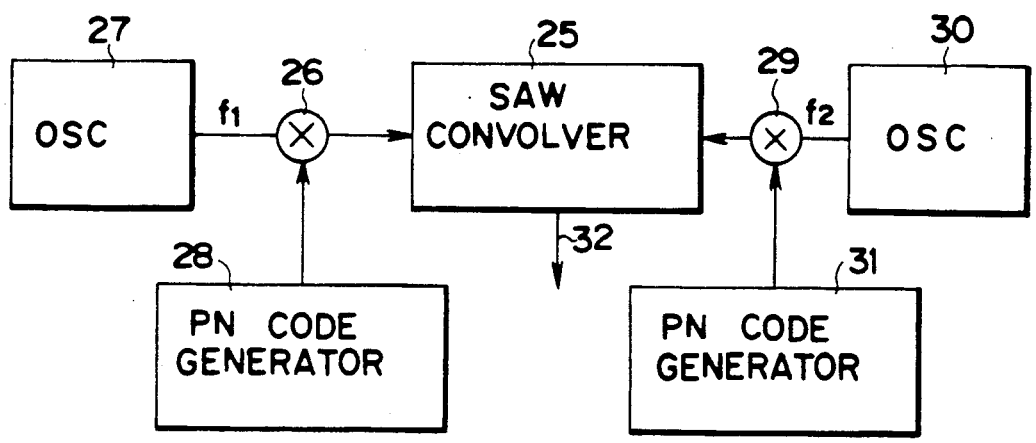
FIG. 1 is a block diagram for explaining how to use the SAW convolver, which is the base of the present invention.

Hereinbelow several embodiments of the present invention will be explained, referring to the drawings.

Figure 2:
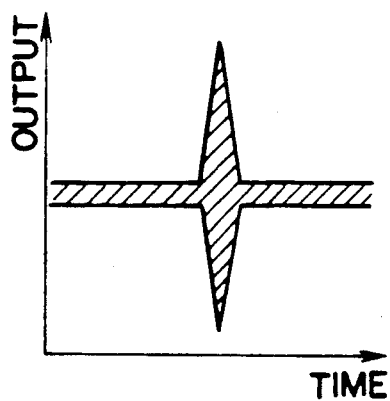
FIGS. 2 and 3 show correlation outputs of the SAW convolver indicated in FIG. 1.
Figure 3:
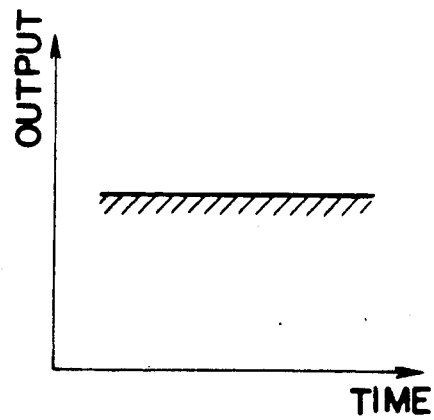

FIGS. 1 to 3 show how to use new basic characteristics of the SAW convolver according to the present invention in a spread spectrum receiver using the SAW convolver.

In the block diagram indicated in FIG. 1 reference numeral 25 is an SAW convolver; 26 and 29 are mixers; 27 and 30 are oscillators; and 28 and 31 are PN code generators. A mixed signal obtained by mixing a signal having a frequency $f_1$ coming from the oscillator 27 and a PN code coming from the PN code generator 28 in the mixer 26 is inputted in the SAW convolver 25 as the received signal. Further a mixed signal obtained by mixing a signal having a frequency $f_2$ coming from the oscillator 30 and a PN code coming from the PN code generator 31, which is inverted in time with respect to the PN code generator 28, is inputted in the SAW convolver 25 as the reference signal. At this time, the output waveform of the convolver output 32 has a convolution peak, as indicated in FIG. 2, in the case where $$\Delta f = |f_1 - f_2''| < f_g \quad (1)$$

($f_g$: inverse of the period of time necessary for the SAW to propagate under the convolution gate electrode of the SAW convolver) and a convolution peak considerably reduced, as indicated in FIG. 3, so that only a small almost noise-like output is obtained, in the case where $$f = |f_1 - f_2| > f_g \quad (2)$$

Consequently, in view of the fact described above, the hopped frequency of the FH in the spread spectrum communication device, which is an embodiment of the present invention, stated later is selected so as to be approximately an integer times as great as $f_g$, a characteristic peculiar to the SAW convolver described above, or frequency hopping points are selected so that there exists a difference in frequency greater than about $f_g$ between the different channels. By selecting such frequency hopping points in the FH spreading, improvement in S/N at the reception has been considerably increased with respect to that obtained in the case where they are selected arbitrarily.

As an example, when $f_a = 215$ MHz and when the frequency on the $f_2$ side was away from 215 MHz by more than about 110 kHz, the convolver output 32 was reduced considerably. Since the central frequency of the SAW convolver used at this time was about 215 MHz and the effective band width was about 30 MHz, the frequency hopping points was able to be set with an interval of about 110 kHz within this frequency band of about 30 MHz.

In this way, it was found that it is possible to set a number of frequency hopping points in a frequency band approximately identical to that of the SAW convolver. For this reason, it was possible to obtain a correlation output by frequency-hopping the reference signal of the SAW convolver.

Figure 4:
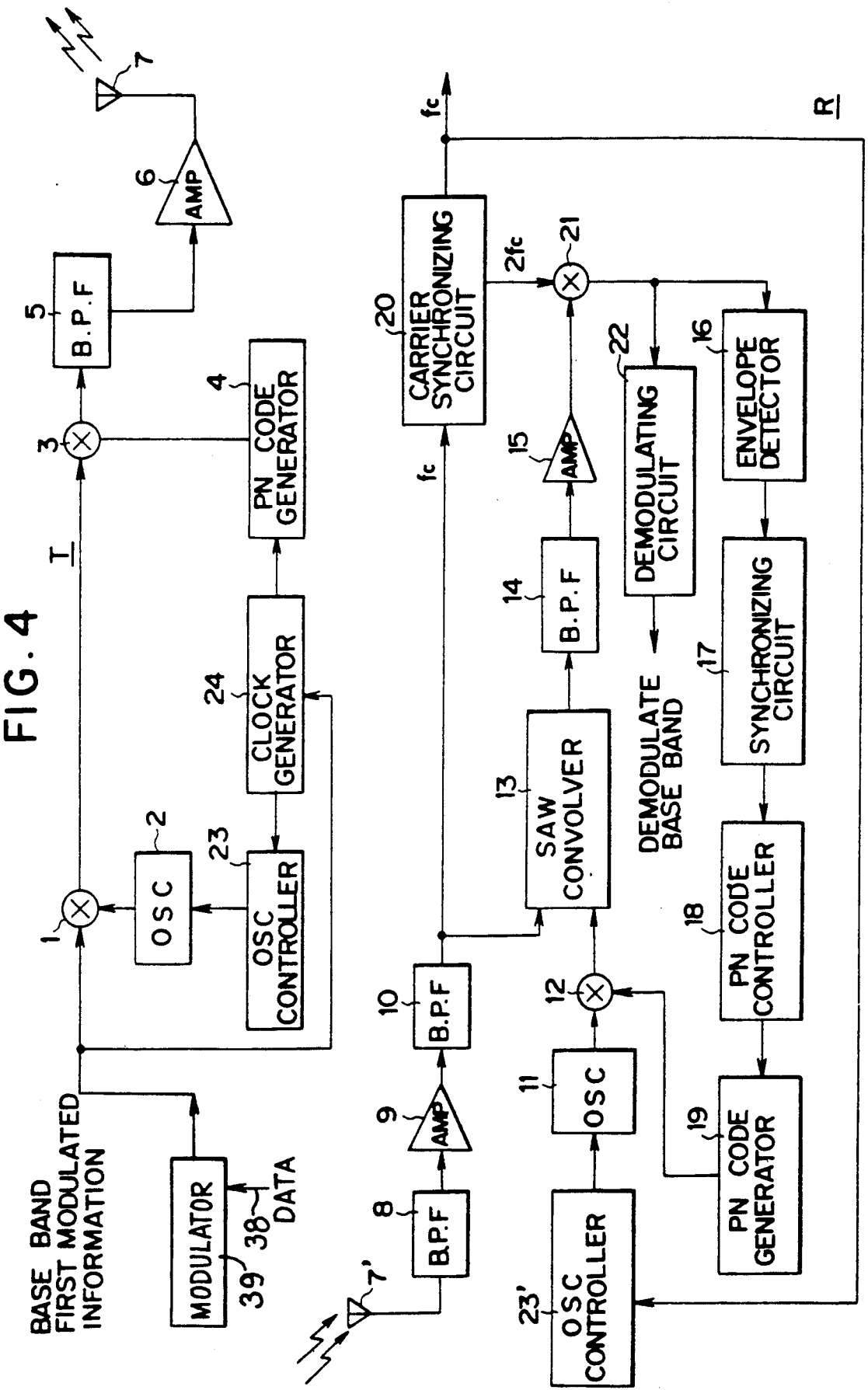
FIG. 4 is a block diagram illustrating the construction of the spread spectrum transmitter and receiver, which is an embodiment of the present invention.

FIG. 4 shows an embodiment of the spread spectrum communication device of the FH/DS system using an SAW convolver according to the present invention.

In the figure, T represents the transmitting section and R the receiving section. The transmitting section T consists of mixers 1, 3, an oscillator 2, a PN code generator 4, a band pass filter 5, an amplifier 6, a transmitting antenna, an oscillator controller 23, and a clock generator 24. On the other hand, the receiving section R consists of a receiving antenna 7', band pass filters 8, 10, 14, amplifiers 9, 15, an oscillator 11, mixers 12, 21, an SAW convolver 13, an envelope detector 16, a synchronizing circuit 17, a PN code controller 18, a PN code generator 19, a carrier synchronizing circuit 20, a demodulating circuit 22 and an oscillator controller 23'. In the transmitting section T, the base band primary modulated information to be transmitted (e.g. a primary modulated signal generated by a modulator 39 according to digital data) is given to the mixer 1 and a signal for hopping the frequency with an interval of the frequency hopping as described above is produced by means of the oscillator controller 23 by the clock coming from the clock generator 24 synchronized with the base band information. A carrier for the FH signal is produced by the oscillator 2 by using this signal and the FH spread modulation of the information is effected by the mixer 1. Thereafter a fast PN code is produced by the PN code generator 4 in synchronism with the clock coming from the clock generator 24, which fast PN code is mixed with the FH spread modulated signal described above in the mixer 3 to effect the DS modulation. Thereafter the signal passes through the band pass filter 5 making the necessary frequency band pass through and further through the amplifier 6 in order to obtain necessary power. After that, the spread spectrum of the FH/DS system is transmitted through the antenna 7.

In the receiving section R, the spread spectrum signal received by the antenna 7' is supplied to the SAW convolver 13 after having been amplified in the high frequency region by the amplifier 9 as well as the band pass filters 8 and 10.

Further the FH/DS signal is supplied to the SAW convolver 13 as the reference signal 11, which FH/DS signal is obtained by modulating the carrier coming from the oscillator 11 generating the FH carrier frequency supplied to the SAW convolver 13 and hopping in the same way as the received signal, by means of the PN code generator 19 generating the PN code inverted in time with respect to the PN code generated by the PN code generator 4 on the transmitter side. The PN code used for the reference signal generation described above is kept to be in synchronism with the PN code, which is sent by the transmitter side and received, by the envelope detecting circuit 16, the synchronizing circuit 17 and the PN code control circuit 18. At this time, the output of the convolver 13 (whose frequency is 2fc, i.e. twice as high as the input carrier frequency fc) is mixed with a signal synchronized with the carrier of the received signal by the synchronizing circuit 20 (frequency 2fc) in the mixer 21 through the band pass filter 14 and the amplifier 15 and led to the envelope detecting circuit 16 for the synchronization of the PN code described above. Further the signal (frequency fc) coming from the carrier synchronizing circuit 20 is led also to the oscillator controller 23' and synchronized also with the oscillator 11 oscillating with the FH carrier frequency described above. The base band primary modulated information is obtained from the modulating circuit 22, when the carrier, the FH signal and the PN code are in synchronism with each other.

Figure 5:
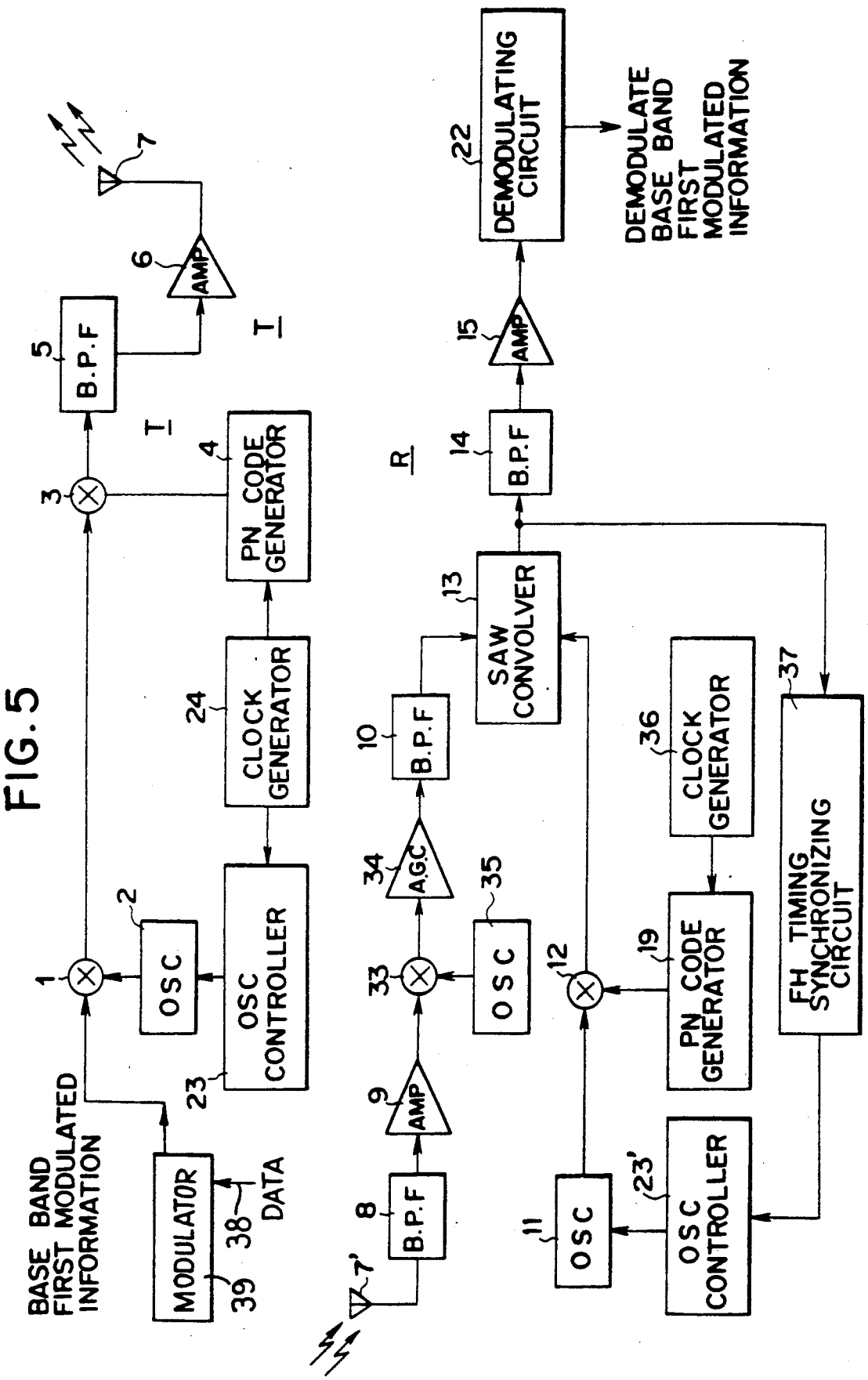
FIG. 5 is a block diagram showing another embodiment of the present invention.
Figure 6:
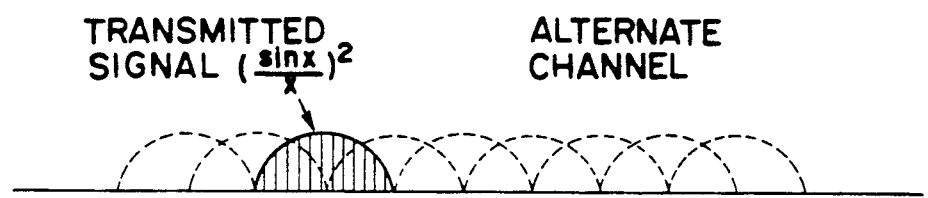
FIG. 6 indicates the spectrum of the FH/DS system.
Figure 7:
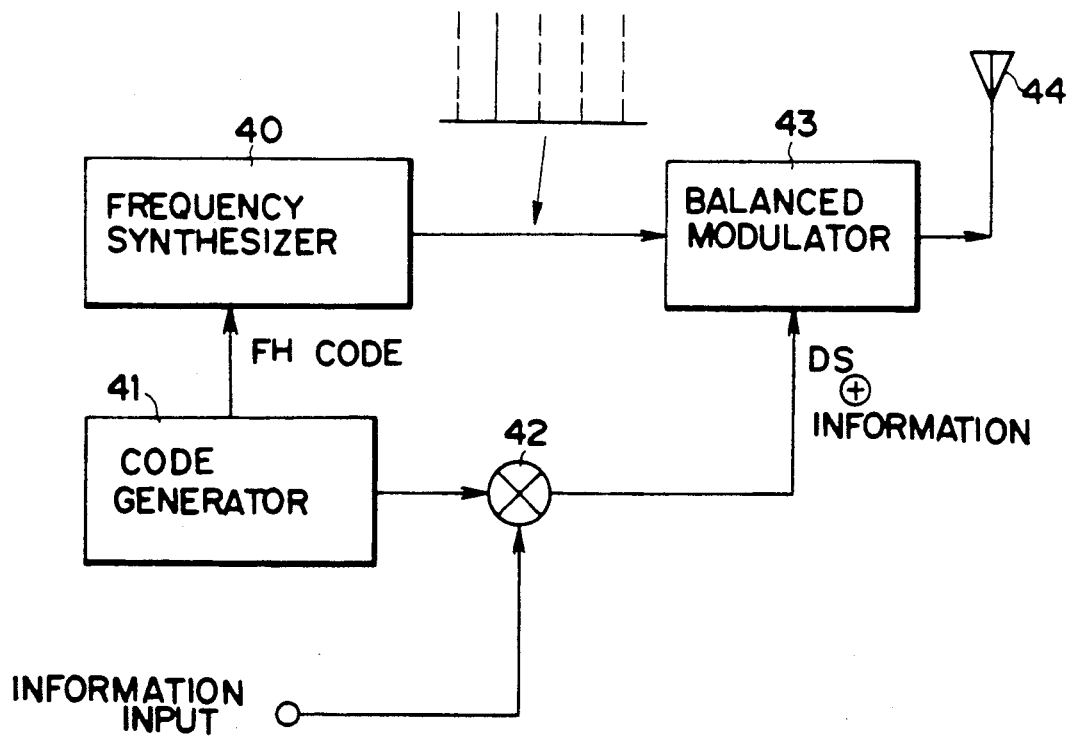
FIG. 7 is a block diagram indicating a prior art FH/DS transmitter.

FIG. 5 shows another embodiment of the FH/DS type spread spectrum transmitter and receiver according to the present invention. In the figure, reference numerals identical to those in FIG. 4 represent circuits identical or analogous thereto. The transmitting section T is almost identical to the transmitting section T indicated in FIG. 4, except that the base band primary modulated information is applied to the clock generator 24. On the other hand, in the receiving section R, reference numeral 33 is a mixer; 34 is an AGC circuit; 35 is a local oscillator; 36 is a clock generator; and 37 is an FH timing synchronizing circuit. In the present embodiment, owing to the fact that the FH signal, i.e. the speed, with which the oscillator 2 hops by the oscillator controller 23, is faster than the base band information and that the speed of the PN code generated by the PN code generator 4 is higher than it, it is not necessary to synchronizing the oscillator controller 23 and the PN code generator 4 with the base band information.

Further, if the speed of the PN code generated by the PN code generator 4 is sufficiently higher than the speed of the oscillator controller 23, when the receiver uses the SAW convolver 13, it is not necessary to synchronize the PN code generator 4 with the oscillator controller 23 on the transmitter side.

Consequently the construction of the receiving section T indicated in FIG. 5 is simple, in which the synchronization is required only for the FH signal.

At first, the spread spectrum signal received by the antenna 7' in the receiving section is converted into an intermediate frequency band by the local oscillator 35 and the mixer 33 after having been amplified by the band pass filter 8 and the amplifier 9.

At this time, the AGC circuit 34 can work easily, if the amplitude of the modulated signal transmitted by the transmitting side is constant, and thus it is possible to eliminate instabilities in the intensity of the received electromagnetic wave such as fading. It is inputted in the SAW convolver 13 as the transmitted signal after having passed through the band pass filter 10.

On the other hand, as the reference signal to the SAW convolver 13, the same signal as the FH/DS spread in the spectrum on the transmitting side (however the PN code for the DS is inverted in time with respect to that used on the transmitting side) is added to form the correlation. The base band primary modulated information is restored by removing noise, taking-out the transmitted signal and making it pass through the demodulating circuit 22 after having made it pass through the band pass filter 14 and the amplifier 15. At this time, the FH timing synchronizing circuit 37 is driven so that the output peak of the SAW convolver 13 is maximum and the timing, with which the FH signal is generated, is regulated by the oscillator controller 23' and the oscillator 11. At this time, the frequency hopping points of the FH signal are set so as to be approximately an integer times as great as $f_g$, or they are set so that there exists a difference in frequency greater than about $f_g$ between the different channels, just as on the transmitting side. However, in order to synchronize the receiver side with the transmitting side concerning the timing and the order of the frequency hopping, the FH timing circuit 37 is driven.

It is not necessary to synchronize the clock generator 36 for the DS signal and the PN code generator 19 with the transmitting side, but the PN code inverted in time with respect to that used on the transmitting side is produced, which is mixed with the FH signal by the mixer, and the FH/DS signal is applied to the SAW convolver 13 as the reference signal.

In this way, in the FH/DS type spread spectrum communication device, if the frequency hopping points of the FH are so set that there exists always a difference greater than $f_g$ between the frequency points, at which the different channels hop, from the characteristics of the SAW convolver, improvement in S/N is easily considerably increased.

As explained above, according to the present invention, in a spread spectrum communication device, since it is possible to construct easily the FH/DS system, information communication can be effected with a high reliability and a small number of errors by means of a very simple transmitter and receiver. In particular, in the case where communication is effected by using an SAW convolver and a weak electromagnetic wave, whose frequency band is restricted, this effect is remarkable and the effect in practice is great.

What is claimed is:

1. A spread spectrum communication device comprising:

a transmitter which includes:

primary modulating means for obtaining base band primary modulated information from data to be transmitted, secondary modulating means for spreading the spectrum by hopping the frequency of said base band primary modulated information; and tertiary modulating means for spreading the spectrum of the output of said secondary modulating means by using a pseudo noise code; and a receiver which includes:

means for generating a reference signal pseudo noise code which is inverted in time with respect to said pseudo noise code in said transmitter, means for generating a frequency hopping signal which is in synchronism with the timing of the frequency hopping in said transmitter, mixing means for producing a mixture of said reference signal pseudo noise code and said frequency hopping signal, and demodulating means having a convolver for correlating said mixture of said reference signal pseudo noise code and said frequency hopping signal with a spread spectrum signal received from said transmitter.

2. A spread spectrum communication device according to claim 1, wherein said convolver in said receiver is a surface acoustic wave convolver.

3. A spread spectrum communication device according to claim 2, wherein adjacent frequency points of said frequency hopping differ from each other by a value greater than the inverse of a period of time necessary for a surface acoustic wave to propagate under an output gate electrode of said surface acoustic wave convolver.

4. A spread spectrum communication device according to claim 1, wherein only the timing of said frequency hopping in said receiver is synchronized between said transmitter and said receiver by setting the speed of the frequency hopping and the speed of said pseudo noise code to be greater than the speed of said base band primary modulated information in said secondary and said tertiary modulating means.

5. A spread spectrum communication device comprising:

a transmitter which includes:

primary modulating means for obtaining base band primary modulated information from data to be transmitted;

secondary modulating means for spreading the spectrum by hopping the frequency asynchronously with said base band primary modulated information; and tertiary modulating means for spreading the spectrum by using a pseudo noise code generated asynchronously with modulation by said primary and secondary modulating means; and a receiver which includes:

means for generating a reference signal pseudo noise code which is inverted in time with respect to said pseudo noise code in said transmitter and which is asynchronous with a carrier frequency and said pseudo noise code of said transmitter;

means for generating a frequency hopping signal which is in synchronism with the timing of the frequency hopping in said transmitter;

means for mixing said reference signal pseudo noise code with said frequency hopping signal; and a convolver in which a signal thus obtained by mixing and a spread spectrum signal received from said transmitter are correlated.

6. A spread spectrum communication device according to claim 5, wherein said convolver in said receiver is a surface acoustic wave convolver.

7. A spread spectrum communication device according to claim 6, wherein adjacent frequency points of said frequency hopping differ from each other by a value great than the inverse of a period of time necessary for a surface acoustic wave to propagate under an output gate electrode of said surface acoustic wave convolver.

8. A spread spectrum communication device according to claim 5, wherein only the timing of said frequency hopping in said receiver is synchronized between said transmitter and said receiver by setting the speed of the frequency hopping and the speed of the pseudo noise code to be greater than the speed of said base band primary modulated information in said secondary and said tertiary modulating means.

9. A spread spectrum communication device, comprising:

a transmitter which includes:

first modulating means for spreading the spectrum by hopping the frequency of base band primary modulated information which includes data to be transmitted; and second modulating means for spreading the spectrum of the output of said first modulating means by using a pseudo noise code; and a receiver which includes:

means for generating a reference signal pseudo noise code which is inverted in time with respect to said pseudo noise code in said transmitter, means for generating a frequency hopping signal which is in synchronism with the timing of the frequency hopping in said transmitter, mixing means for producing a mixture of said reference signal pseudo noise code and said frequency hopping signal, and demodulating means having a convolver for correlating a spread spectrum signal received from said transmitter with said mixture of said reference signal pseudo noise code and said frequency hopping signal.

10. A spread spectrum communication device, comprising:

a transmitter which includes:

first modulating means for spreading the spectrum by hopping the frequency asynchronously with base band primary modulated information which includes data to be transmitted; and second modulating means for spreading the spectrum by using a pseudo noise code generated asynchronously with said base band primary modulated information and said modulation by said first modulating means; and a receiver which includes:

means for generating a reference signal pseudo noise code which is inverted in time with respect to said pseudo noise code in said transmitter and which is asynchronous with a carrier frequency and said pseudo noise code of said transmitter;

means for generating a frequency hopping signal which is in synchronism with the timing of the frequency hopping in said transmitter;

mixing means for generating an output signal by mixing said reference signal pseudo noise code and said frequency hopping signal; and a convolver in which said output signal of said mixing means and a spread spectrum signal received from said transmitter are correlated.

11. A spread spectrum communication device, comprising:

a transmitter which includes:

primary modulating means for obtaining base band primary modulated information from data to be transmitted;

means for generating a first frequency hopping signal in response to the base band primary modulated information;

secondary modulating means for spreading the spectrum by hopping the frequency of said base band primary modulated information in response to said first frequency hopping signal;

pseudo noise generator means for generating a transmitter pseudo noise code; and tertiary modulating means for spreading the spectrum of the output of said secondary modulating means by using said transmitter pseudo noise code; and a receiver which includes:

reference signal pseudo noise code generator means for generating a reference signal pseudo noise code which is inverted in time with respect to said transmitter pseudo noise code;

second means for generating a second frequency hopping signal which is in synchronism with the timing of said first frequency hoping signal in said transmitter;

mixer means for mixing said reference signal pseudo noise code and said second frequency hopping signal, and outputting a mixture signal; and demodulating means having a convolver for correlating said mixture signal from said mixer means with a spread spectrum signal received from said transmitter.

* * * * *